June 1, 1948. H. G. FERGUSON 2,442,458
TRACTOR-TRAILER AND SAFETY HITCH THEREFOR
Original Filed Jan. 14, 1943 4 Sheets-Sheet 1
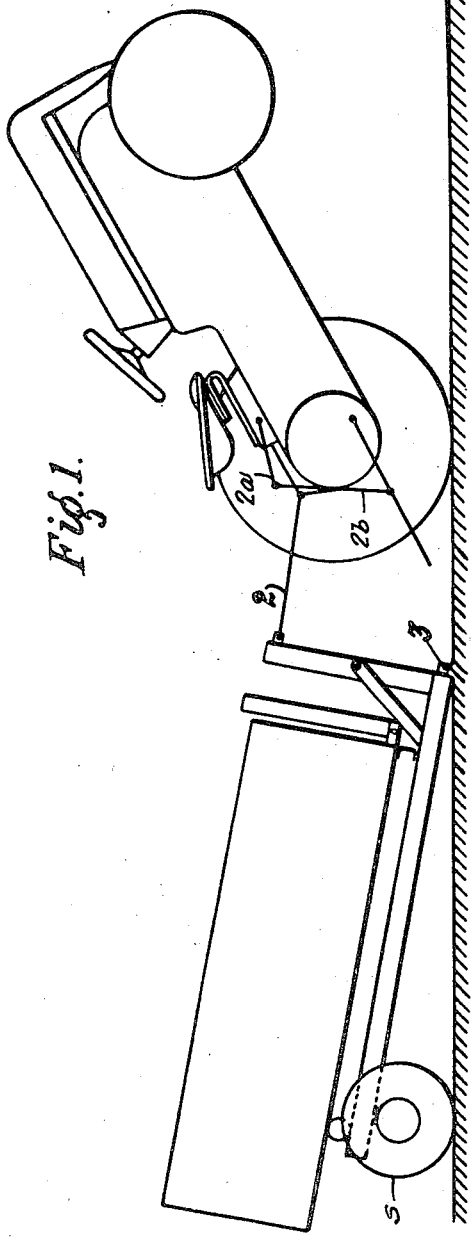
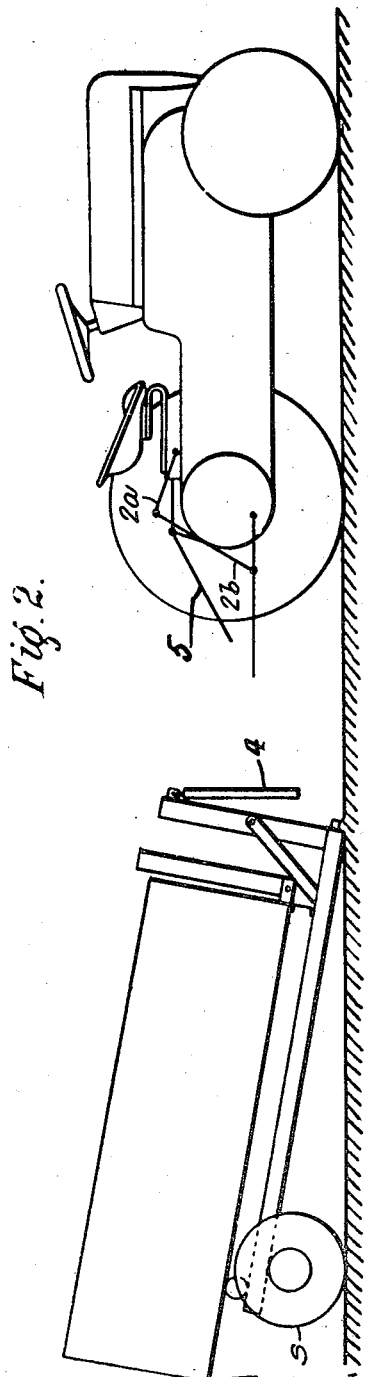
Inventor
Henry G. Ferguson
By Cushman, Pitzner, Hubbard & Cushman
Attys.

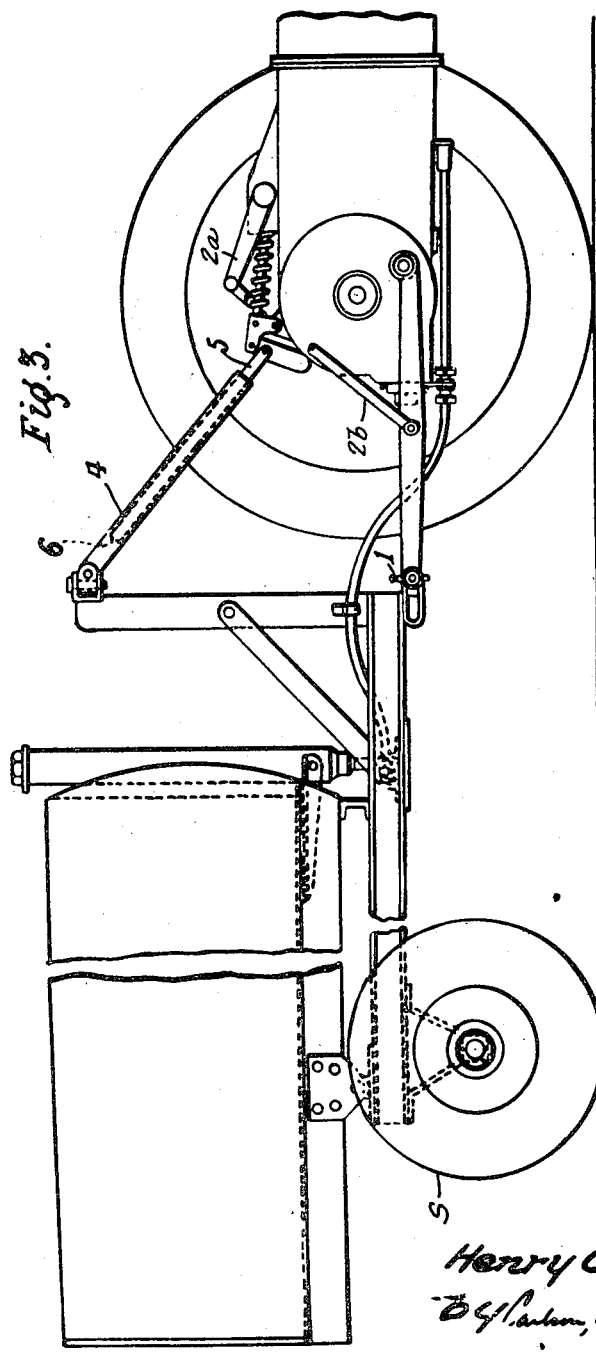

June 1, 1948. H. G. FERGUSON 2,442,458
TRACTOR-TRAILER AND SAFETY HITCH THEREFOR
Original Filed Jan. 14, 1943 4 Sheets-Sheet 3
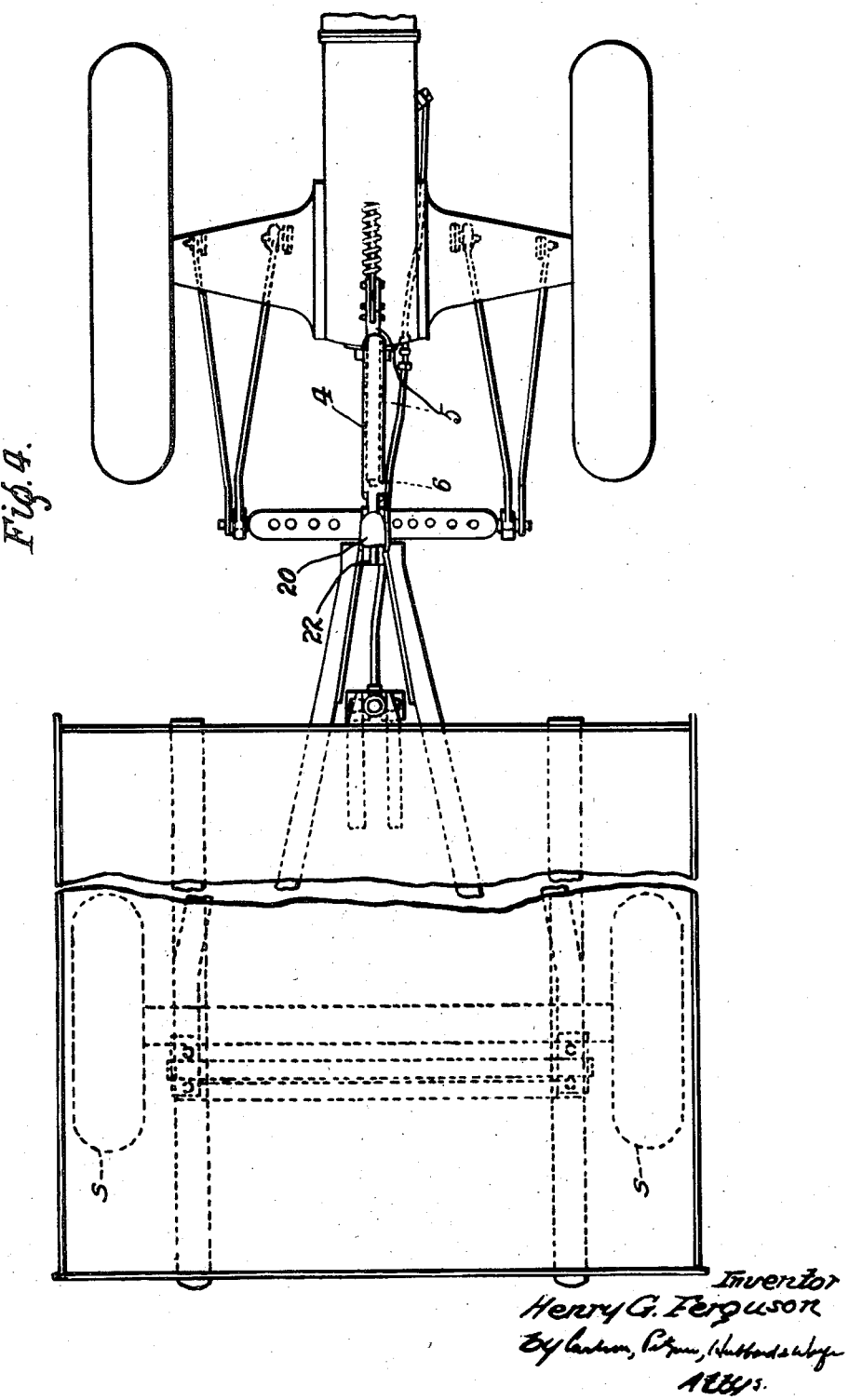

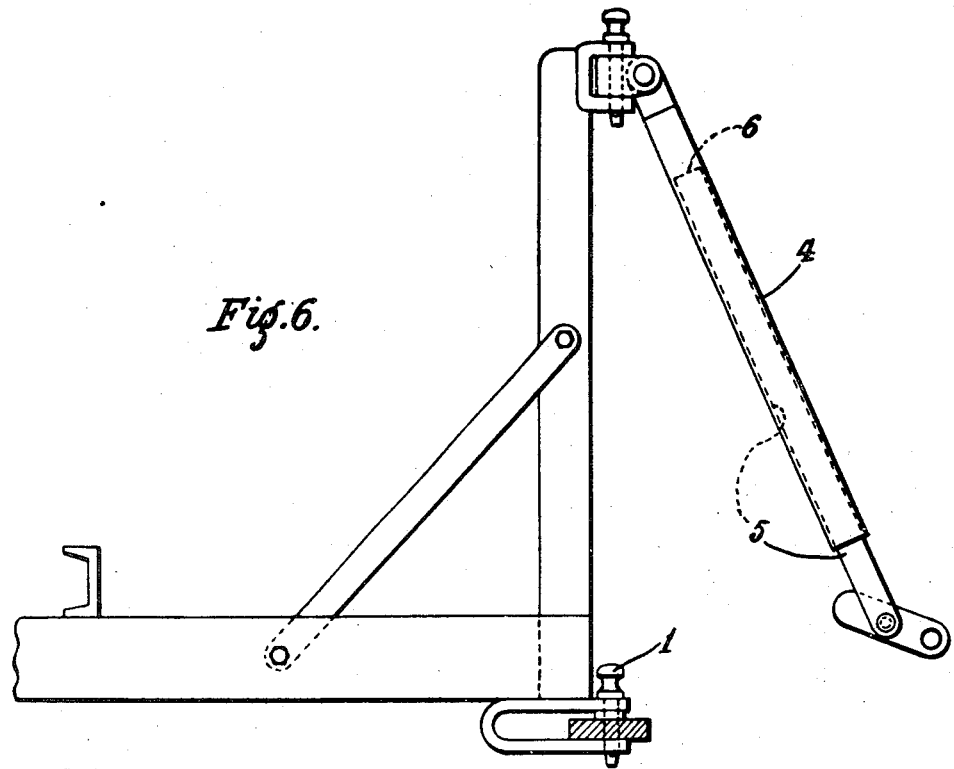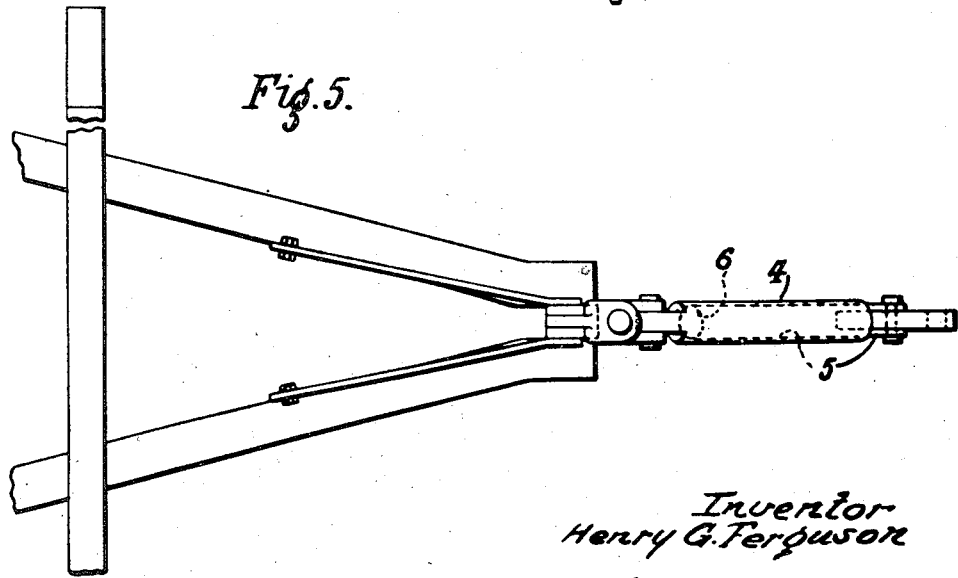

Patented June 1, 1948

2,442,458

UNITED STATES PATENT OFFICE 2,442,458

TRACTOR-TRAILER AND SAFETY HITCH THEREFOR

Henry George Ferguson, Belfast, Northern Ireland

Original application January 14, 1943, Serial No. 472,380. Divided and this application June 11, 1945, Serial No. 598,722. In Great Britain February 27, 1942

9 Claims. (Cl. 280—33.4)

The present invention relates to hitch means for connecting unbalanced trailable devices to tractive vehicles and especially for connecting two-wheeled or equivalent non-self-balancing trailers to lightweight agricultural tractors, that is, for trailers or equivalent devices which are not only drawn by the tractive vehicle, but are also supported or steadied against tipping thereby.

The general aim of the present invention is to prevent damage to a tractor, having a trailer hitched to it by upper and lower links, in the event that the lower linkage is disconnected, either through breakage or inadvertence.

More particularly, it is an object of the present invention to provide a hitch connection between a tractive vehicle and an unbalanced trailer device, comprising upper and lower link means normally respectively under compression and tension due to the unbalanced weight or load of said device, the upper link means comprising separable elements adapted to engage together under compression and transmit a thrust to the vehicle but adapted to part company under tension, as for example, when the lower link means becomes disconnected in operation, and thus free the vehicle from the trailer device and prevent damage or overturning of the vehicle and consequent accidents.

In order that the nature and objects of the invention will be clearly understood, the following specific embodiments as applied to a lightweight Ford-Ferguson tractor will now be described by way of example with reference to the accompanying drawings, in which:

Figure 1 is a diagrammatic side view of a tractor and trailer.

Fig. 2 is a corresponding view in accordance with the present invention.

Fig. 3 is a side view of the safety hitch link in accordance with the invention.

Fig. 4 is a corresponding plan view.

Figs. 5 and 6 are corresponding side and plan views of the safety linkage to a larger scale.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to Fig. 1 of the drawings, there is shown diagrammatically a Ford-Ferguson tractor with a trailer attached in accordance with the invention set forth in my application Serial No. 348,927, filed July 31, 1940 (now Patent No. 2,347,898, issued May 2, 1944), the trailer having its ground-engaging support means or wheels S to the rear so that the resultant of its downwardly-acting weight or load is located forward of said wheels. As described in said application, the tractor has power means for raising and lowering the links including the cranks 2a, and drop links 2b. It has been found with this arrangement that, should the lower linkage connection be disconnected or become disconnected during operation, an extremely dangerous condition may arise. Disconnection may arise through the operator omitting to insert, or insert properly, the pin 1 (Figs. 3 and 4) or through the pin coming out or breaking during operation. If disconnection of the lower linkage should occur due to the above or any other cause the trailer tips down as shown and the top link 2 then comes under tension and no longer transmits as a compressive thrust the unbalanced trailer weight down on to the tractor. Owing to the top link 2 being connected to the tractor well above the rear axle the pull on the link tends to make the tractor rear backwardly as shown and if the front of the trailer catches an obstruction or digs into the ground as indicated at 3, the tractor may even turn completely over with the possibility of a fatal accident to the operator.

In accordance with the present invention and referring to Figs. 3 to 6, the top link consists of a tubular outer part 4 pivotally connected to the trailer and an inner rod 5 pivotally connected to the tractor. The parts 4 and 5 are respectively connected to the trailer and tractor as in Figs. 1 to 5 of said Patent No. 2,347,898 and the futher details and operation of the arrangement in Figs. 3 to 6 are substantially as shown in and described with reference to said Figs. 1 to 5 of said Patent No. 2,347,898 and need not be further described.

The rod 5 is a sliding fit in the tube or socket member 4 being substantially coaxial with respect thereto, and the top end of the rod is engaged by the inner closed end 6 of the tube so that the composite, telescopic link 4, 5 normally transmits the unbalanced trailer weight on to the tractor as described in said Patent No. 2,347,-898. However, if the lower link connection should part from any cause the rod 5 simply slips out of the tube 4 and the danger of the tractor rearing and causing a serious accident is entirely avoided.

Fig. 2 shows diagrammatically the trailer tilted forward and the tractor clear thereof, the rod 5 having simply slipped out of the tube 4 as described above.

In addition to avoiding the danger described the top link due to its telescopic nature and construction cannot be incorrectly used as a single hitch for dragging logs or other objects or devices which may catch on obstructions and give rise to the danger of overturning and accident.

The telescopic link also allows further freedom for up and down movement between the tractor and trailer on uneven ground.

The present application is a division of my copending application Serial No. 472,380, filed January 14, 1943, now Patent No. 2,393,358, issued Jan. 22, 1946.

I claim as my invention:

1. In combination a trailable device having ground-engaging support means and having the center or resultant of its downwardly acting weight or load in front of said support means, a tractive vehicle including driving ground wheel means and a hitch connection comprising upper and lower connection means respectively under compression and tension due to said weight or load and adapted to allow relative up and down movement between the vehicle and device, and said upper connection means comprising elements capable of transmitting a thrust from one to the other and relatively movable along the axis of such thrust but adapted to part company under tension.

2. In combination a non-self-balancing trailer including ground wheels and having the downwardly-acting resultant of its weight or load in front of said ground wheels, a tractive vehicle including front wheels and rear driving wheels and a hitch connection between said vehicle and trailer comprising upper and lower link means pivotally connected to the trailer and vehicle to allow relative up and down movement therebetween and respectively under compression and tension due to said weight or load and directed to distribute said weight or load forwardly of the actual connections of the link means to said vehicle, the said upper link means comprising coaxially disposed relatively slidable elements adapted to bear against each other under compression but to part company under tension and disconnect the upper link connection between the vehicle and trailer.

3. In combination a tractor having rear driving wheels, triangularly spaced attachment points at the rear for hitch links, and means for supporting the hitch links from the tractor; an unbalanced trailer comprising a chassis having road wheels at or near the rear and upper and lower vertically aligned attachment means at the front, and a load-receiving platform having the major part of its load-receiving surface in front of the axis of said road wheels; and a hitch connection between said trailer and tractor comprising an upper link pivotally attached to said upper attachment means on the trailer and to one of the attachment points on the tractor, the upper attachment means on the trailer being located above the attachment point on the tractor so that the link is inclined downwardly to the tractor and its axial projection passing through said upper attachment means and said attachment point passes over and down in front of the axis of the tractor rear wheels, two lower laterally spaced links universally attached to the tractor at the two other attachment points, a cross bar connecting the rear ends of said links and engageable with the lower attachment means on the trailer, and check links connected to the tractor and to the lower links to prevent lateral but not vertical swinging of the latter, said upper link comprising a female element and a male element adapted to engage therein to transmit a thrust and remain in alignment each with the other but adapted to part company under tension as when the cross bar becomes disconnected from the lower attachment means on the trailer.

4. The combination as claimed in claim 3, in which the upper and lower attachment means on the trailer each comprise a clevis and wherein the upper link comprises a tabular element having an abutting face and a rod element slidable therein and having an abutting face adapted to bear against said first mentioned abutting face under compression, one element being pivotally connected to the attachment point on the tractor and the other element being pivotally connected to a member pivotally connected by vertical pin means to the upper clevis, and the lower clevis being pivotally connected with the cross bar by vertical pin means in vertical alignment with said first-mentioned pin means.

5. In combination a trialable device having ground-engaging support means and having the center or resultant of its downwardly acting weight or load in front of said support means, and a hitch for connecting said device with a tractive vehicle, said hitch including upper and lower connection means respectively operating in use under compression and tension due to said weight or load and adapted to allow relative up and down movement between the vehicle and device, said upper connection means having relatively slidable complementary members held in abutment under compression but capable of separation under tension.

6. In a trailer attachment for a tractor having hitch link means trailingly pivoted on its rear end portion, the combination with a trailer having ground-engaging support means and overbalanced forwardly about the latter, of means for attaching said trailer to said link means for application of draft load tensionally to the latter, together with connecting means for resisting forward tilting of said trailer, said connecting means being adapted for connection at its opposite ends to trailer and tractor and comprising elements capable of transmitting a thrust and relatively movable along the axis of such thrust but adapted to part company under tension.

7. In a trailer attachment for a tractor, the combination of a trailer, upper and lower hitch connections on the front end of said trailer adapted for attachment to the tractor in position to place the lower connection under tension and the upper connection under compression during normal trailing of the trailer behind the tractor, and said upper connection comprising elements capable of transmitting a thrust from one to the other and relatively movable along the axis of such thrust but adapted to part company under tension.

8. A safety hitch link for attachment of a trailer device to a tractor comprising in combination a pair of elongated axially aligned members presenting opposed faces for abutment with each other upon application of a compression load thereto, means carried by one of said members for slidably guiding the other for axial movement while restraining such members against lateral angling with respect to each other and adapted to permit said other member to pull free thereof upon application of a tension load, and means on the outer ends of said members for pivotally attaching the same respectively to a tractor and to a trailer device.

9. A safety hitch link for attachment of a trailer device to a tractor comprising, in combination, an elongated generally tubular socket member, a rod member slidably entered in said socket member and adapted to abut against the inner end of the latter for the transmission of thrust, said rod member being adapted to slide freely out of said socket member to part company therewith upon the application of tension, and means on the outer ends of said members for pivotally attaching the same respectively to a tractor and to a trailer device.

HENRY GEORGE FERGUSON.

REFERENCES CITED

The following references are of record in the file of this patent:

UNITED STATES PATENTS

| Number | Name | Date |
| --- | --- | --- |
| 1,815,470 | Gaiser | July 21, 1931 |